United States Patent
Kinouchi et al.

(10) Patent No.: US 9,024,564 B2
(45) Date of Patent: May 5, 2015

(54) DRIVE CONTROL DEVICE AND DRIVE CONTROL METHOD

(71) Applicants: Shinichi Kinouchi, Chiyoda-ku (JP); Kosuke Nakano, Chiyoda-ku (JP)

(72) Inventors: Shinichi Kinouchi, Chiyoda-ku (JP); Kosuke Nakano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 13/851,511

(22) Filed: Mar. 27, 2013

(65) Prior Publication Data

US 2014/0077745 A1      Mar. 20, 2014

(30) Foreign Application Priority Data

Sep. 20, 2012   (JP) .................................. 2012-207537

(51) Int. Cl.
| | |
|---|---|
| H02P 27/00 | (2006.01) |
| H02P 27/06 | (2006.01) |
| H02P 27/08 | (2006.01) |
| H02H 7/09 | (2006.01) |
| H02M 1/32 | (2007.01) |

(52) U.S. Cl.
CPC ................. *H02P 27/06* (2013.01); *H02P 27/08* (2013.01); *H02H 7/09* (2013.01); *H02M 1/32* (2013.01)

(58) Field of Classification Search
USPC .......... 318/514, 439, 400.17, 400.21, 400.22, 318/400.29; 361/33
See application file for complete search history.

(56) References Cited

U.S. PATENT DOCUMENTS

| | | | | |
|---|---|---|---|---|
| 4,060,841 | A * | 11/1977 | Allen ............................... | 361/33 |
| 4,100,468 | A * | 7/1978 | Slocum ......................... | 318/783 |
| 4,189,666 | A * | 2/1980 | Tetsugu et al. ................ | 388/816 |
| 5,450,309 | A * | 9/1995 | Rohner ........................... | 363/71 |
| 5,469,351 | A * | 11/1995 | Masrur et al. ............. | 363/56.02 |
| 5,990,654 | A * | 11/1999 | Skibinski et al. ............. | 318/800 |
| 7,019,479 | B2 * | 3/2006 | Tobias et al. ............. | 318/400.21 |
| 7,436,686 | B2 * | 10/2008 | Mavier et al. .................. | 363/95 |
| 7,479,756 | B2 * | 1/2009 | Kasunich et al. ............. | 318/732 |
| 8,198,852 | B2 * | 6/2012 | Aono et al. ................... | 318/650 |
| 2004/0160208 | A1 * | 8/2004 | Youm et al. ................... | 318/801 |

(Continued)

FOREIGN PATENT DOCUMENTS

| | | |
|---|---|---|
| JP | 09-275699 A | 10/1997 |
| JP | 2011-045212 A | 3/2011 |
| WO | 2010-131355 A1 | 11/2010 |

OTHER PUBLICATIONS

Japanese Office Action (Notice of Rejection), mailed Dec. 24, 2013, Application No. 2012-207537.

*Primary Examiner* — Paul Ip

(74) *Attorney, Agent, or Firm* — Sughrue Mion, PLLC; Richard C. Turner

(57) ABSTRACT

The invention provides a drive control device that comprises: inverters that are connected to a motor; a variable resistive element that is connected between the motor and each of the inverters; a current/voltage detection device connected between the motor and each of the inverters; and a controller that, when detecting a fault of an inverter that drives the motor based on a detection signal from the current/voltage detection device, gradually increases a resistance value of a variable resistive element provided between the faulty inverter and the motor at a velocity of a resistance variation such that a surge voltage has a voltage value for which the variable resistive element and the motor are not damaged, and executes drive control of the motor by a normal inverter other than the faulty inverter.

3 Claims, 3 Drawing Sheets

(56) References Cited

U.S. PATENT DOCUMENTS

| | | | |
|---|---|---|---|
| 2004/0227479 A1* | 11/2004 | Youm | 318/375 |
| 2004/0257018 A1* | 12/2004 | Tobias et al. | 318/439 |
| 2005/0116474 A1* | 6/2005 | Edelson | 290/40 A |
| 2007/0086226 A1* | 4/2007 | Mavier et al. | 363/132 |
| 2007/0291426 A1* | 12/2007 | Kasunich et al. | 361/33 |
| 2008/0297095 A1* | 12/2008 | Aono et al. | 318/650 |
| 2010/0141189 A1* | 6/2010 | Matt et al. | 318/400.26 |
| 2010/0259206 A1* | 10/2010 | Joachimsmeyer | 318/400.17 |
| 2010/0295489 A1* | 11/2010 | Sano et al. | 318/400.32 |
| 2011/0043152 A1* | 2/2011 | Kidokoro et al. | 318/490 |
| 2011/0156626 A1* | 6/2011 | Mukai et al. | 318/400.21 |
| 2011/0156627 A1* | 6/2011 | Nakamura et al. | 318/400.22 |
| 2011/0156629 A1* | 6/2011 | Satou et al. | 318/453 |
| 2012/0043817 A1* | 2/2012 | Hartwig et al. | 307/73 |
| 2013/0009580 A1* | 1/2013 | De Wergifosse | 318/400.26 |
| 2013/0221888 A1* | 8/2013 | Horikoshi et al. | 318/400.29 |

* cited by examiner

DRIVE CONTROL DEVICE AND DRIVE CONTROL METHOD

BACKGROUND OF THE INVENTION

1. Field of the Invention

The present invention relates to a drive control device and a drive control method for executing drive control of a motor connected with a plurality of inverters.

2. Description of the Related Art

In so-called "power steering" that assists control of a steering wheel using an electric motor, when a failure occurs in an inverter that supplies electric power to the motor, a wheel steerer person needs to perform a wheel operation by only his own power. However, in a case of a large vehicle, a torque is large and steering by only his own power requires a large force, which causes a large burden on the driver.

A plurality of inverters are connected to the electric motor, so that steering by only his own power can be prevented by, when a failure of one inverter occurs, causing another inverter to be operated. However, in order to enable a continuous operation of the motor by inverters other than the faulty inverter, a device for controlling a current conduction state, such as a switch is required between the faulty inverter and the motor (for example, see Japanese Patent Application Laid-open No. 9-275699 and Japanese Patent Application Laid-open No. 2011-45212).

As described in Japanese Patent Application Laid-open No. 9-275699 and Japanese Patent Application Laid-open No. 2011-45212, conventionally a switch and the like are provided between a faulty inverter and a motor, the switch is either in a short-circuit state or in an open state. Therefore, when a circuit including the motor and the inverter is changed from a short-circuit state to an open state, a large surge voltage is generated by an inductance component in the circuit, and insulation breakdown may occur in motor windings or the switch itself may be broken.

The present invention has been achieved in view of the above circumstances, and an object of the present invention is to provide a drive control device and a drive control method for suppressing generation of a surge voltage when a failure occurs in an inverter that drives a motor and driving of the motor is continued by other normal inverters.

SUMMARY OF THE INVENTION

It is an object of the present invention to at least partially solve the problems in the conventional technology.

One aspect of the present invention is a drive control device comprising: a plurality of inverters that are each connected to a motor and capable of driving the motor; a variable resistive element that is connected between the motor and each of the inverters, and has its resistance value capable of being externally and variably controlled; an output detection unit that is connected between the motor and each of the inverters, and detects at least one of an output current and an output voltage of each of the inverters; and a controller that, when detecting a fault of an inverter that drives the motor based on a detection signal from the output detection unit, stops an operation of the faulty inverter, gradually increases a resistance value of the variable resistive element provided between the faulty inverter and the motor at a velocity of a resistance variation such that a surge voltage generated due to an inductance component of a circuit including the motor and the faulty inverter has a voltage value for which the variable resistive element and the motor are not damaged, and executes drive control of the motor using a normal inverter other than the faulty inverter.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a drive control device and a drive control method according to the present invention will be explained below in detail with reference to the accompanying drawings. The present invention is not limited to the embodiments.

First Embodiment

Figure 1:
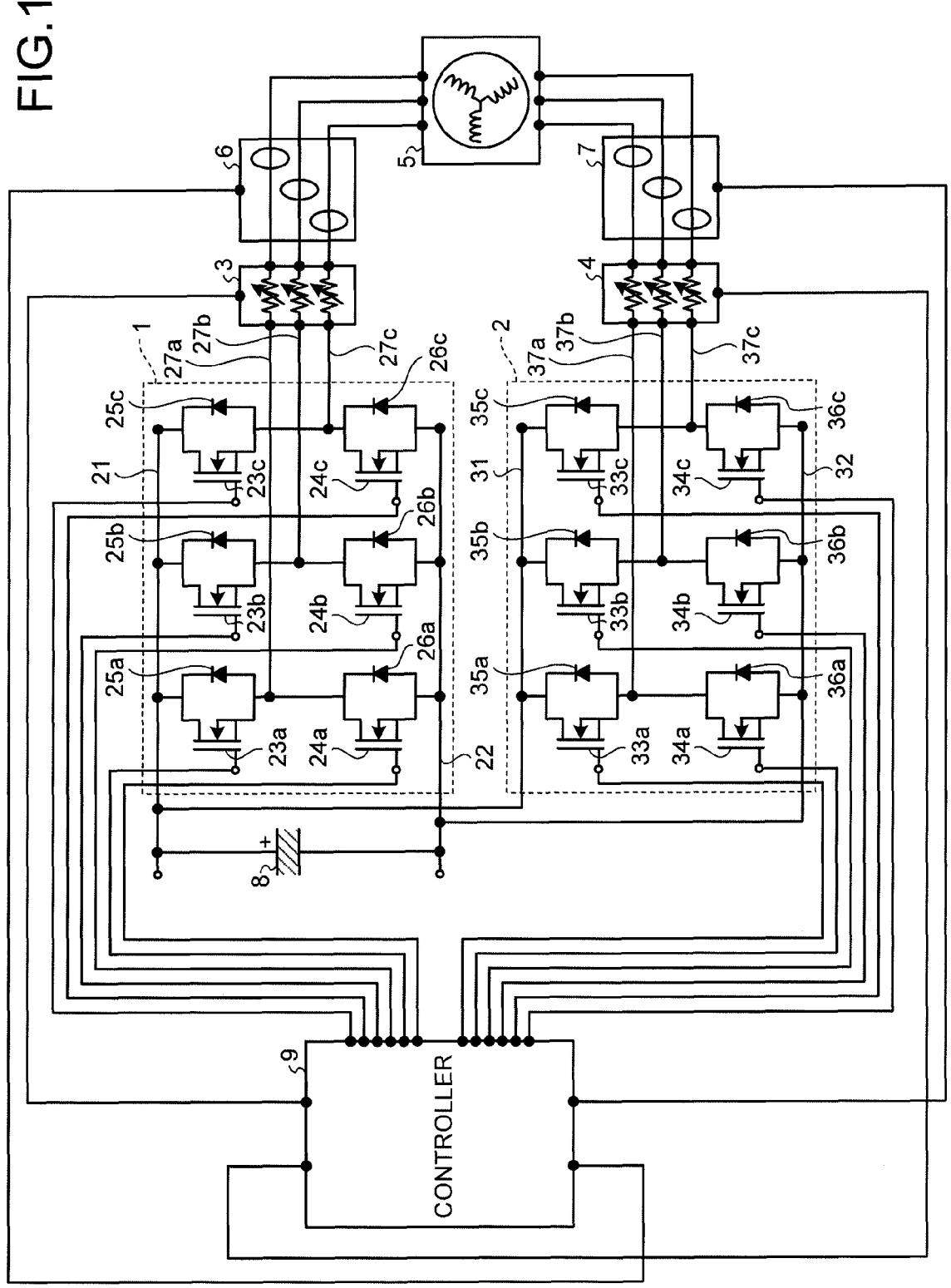
FIG. 1 is an electrical circuit diagram of a configuration of a drive control device according to a first embodiment of the present invention.

FIG. 1 is an electrical circuit diagram of a configuration of a drive control device according to a first embodiment of the present invention. As shown in FIG. 1, the drive control device according to the first embodiment is a drive control device that executes drive control of a motor 5. The drive control device is configured to include: inverters 1 and 2 as a plurality of inverters connected to the motor 5; a smoothing capacitor 8 whose ends are connected to the inverters 1 and 2; a variable resistive element 3 that is connected between the inverter 1 and the motor 5 and has a resistance value that can be externally controlled; a variable resistive element 4 that is connected between the inverter 2 and the motor 5 and has a resistance value that can be externally controlled; a current/voltage detection device 6 that is connected between the inverter 1 and the motor 5 and detects an output current and an output voltage of the inverter 1; a current/voltage detection device 7 that is connected between the inverter 2 and the motor 5 and detects an output current and an output voltage of the inverter 2; and a controller 9 that can control the inverters 1 and 2 and the variable resistive elements 3 and 4 based on detection signals from the current/voltage detection devices 6 and 7.

The motor 5 is driven under control of only the inverter 1 or control of only the inverter 2, or simultaneous control of the inverters 1 and 2. Electric power for driving the motor 5 is supplied from the smoothing capacitor 8 to the motor 5 via the inverter 1 or 2 and through the variable resistive element 3 or 4. A direct-current (DC) voltage is supplied from a DC power supply such as a battery (not shown) to the smoothing capacitor 8. Each of the inverters 1 and 2 can drive the motor 5 using electrical energy accumulated in the smoothing capacitor 8.

The inverter 1 is a three-phase inverter and can be output-controlled by gate signals (Gu1, Gv1 and Ow1) of respective phases from the controller 9 to drive the motor 5. Similarly, the inverter 2 is a three-phase inverter and can be output-controlled by gate signals (Gu2, Gv2 and Gw2) of respective phases from the controller 9 to drive the motor 5. A DC high-potential-side bus 21 of the inverter 1 and a DC high-potential-side bus 31 of the inverter 2 are connected with each other, and their connection point is connected to a positive terminal (+) of the smoothing capacitor 8. A DC low-potential-side bus 22 of the inverter 1 and a DC low-potential-side bus 32 of the inverter 2 are connected with each other, and their connection point is connected to a negative terminal of the smoothing capacitor 8.

The inverter 1 includes: for respective phases of U1, V1 and W1, MOSFETs (Metal Oxide Semiconductor Field Effect Transistors) 23a to 23c as high-potential-side semiconductor switching elements that switch between the positive-terminal (+) side of the smoothing capacitor 8 and alternating-current (AC) output lines 27a to 27c of the respective phases; diodes 25a to 25c that are respectively connected to the MOSFETs 23a to 23c in an inverse-parallel connection manner; MOSFETs 24a to 24c as low-potential-side semiconductor switching elements that switch between the negative-terminal side of the smoothing capacitor 8 and the AC output lines 27a to 27c of the respective phases; and diodes 26a to 26c that are respectively connected to the MOSFETs 24a to 24c in an inverse-parallel connection manner. The MOSFET 23a and the diode 25a constitute a U1-phase upper arm, the MOSFET 23b and the diode 25b constitute a V1-phase upper arm, and the MOSFET 23c and the diode 25c constitute a W1-phase upper arm. The MOSFET 24a and the diode 26a constitute a U1-phase lower arm, the MOSFET 24b and the diode 26b constitute a V1-phase lower arm, and the MOSFET 24c and the diode 26c constitute a W1-phase lower arm. The MOSFETs 23a to 23c and 24a to 24c have parasitic diodes connected between sources and drains, respectively.

The inverter 2 includes: for respective phases of U2, V2 and W2, MOSFETs 33a to 33c as high-potential-side semiconductor switching elements that switch between the positive-terminal (+) side of the smoothing capacitor 8 and AC output lines 37a to 37c of the respective phases; diodes 35a to 35c that are respectively connected to the MOSFETs 33a to 33c in an inverse-parallel connection manner; MOSFETs 34a to 34c as low-potential-side semiconductor switching elements that switch between the negative-terminal side of the smoothing capacitor 8 and the AC output lines 37a to 37c of the respective phases; and diodes 36a to 36c that are respective connected to the MOSFETs 34a to 34c in an inverse-parallel connection manner. The MOSFET 33a and the diode 35a constitute a U2-phase upper arm, the MOSFET 33b and the diode 35b constitute a V2-phase upper arm, and the MOSFET 33c and the diode 35c constitute a W2-phase upper arm. The MOSFET 34a and the diode 36a constitute a U2-phase lower arm, the MOSFET 34b and the diode 36b constitute a V2-phase lower arm, and the MOSFET 34c and the diode 36c constitute a W2-phase lower arm. The MOSFETs 33a to 33c and 34a to 34c have parasitic diodes connected between sources and drains, respectively.

As an example, a case of using a MOSFET as a semiconductor switching element has been described in the first embodiment, but an IGBT (Insulated Gate Bipolar Transistor) may be used instead thereof, for example.

Gate signals G (Gu1, Gv1, Gw1, Gu2, Gv2 and Gw2) of the respective phases that control outputting of the inverters 1 and 2 are generated under PWM (Pulse Width Modulation) control.

The variable resistive element 3 is provided for each of the AC output lines 27a to 27c of the respective phases between the inverter 1 and the motor 5, and the variable resistive element 4 is provided for each of the AC output lines 37a to 37c of the respective phases between the inverter 2 and the motor 5. For the variable resistive elements 3 and 4, a device that varies its resistance value in dependence on a voltage applied thereto externally (from the controller 9 in this example), such as a varistor, can be used.

The current/voltage detection device 6 detects currents and voltages of the AC output lines 27a to 27c of the respective phases between the inverter 1 and the motor 5. The current/voltage detection device 7 detects currents and voltages of the AC output lines 37a to 37c of the respective phases between the inverter 2 and the motor 5. The current/voltage detection devices 6 and 7 may be each a device that detects an abnormality of any one of a current and a voltage.

An operation of the first embodiment is explained next. There is assumed a case where a failure occurs in the inverter 1 when the motor 5 is driven by the inverters 1 and 2 simultaneously. The following explanation is also applied to a case where a failure occurs in the inverter 2. When a failure occurs in the inverter 1, the current/voltage detection device 6 detects abnormalities of the output current and the output voltage from the inverter 1 to the motor 5. A detection signal obtained by the detection of the current/voltage detection device 6 is processed in the controller 9 that manages the overall drive control device.

The controller 9 detects abnormalities of the output current and the output voltage of the inverter 1 based on the detection signal from the current/voltage detection device 6, and when it detects the fault of the inverter 1, the controller 9 causes an operation of the inverter 1 to be stopped and at the same time the resistance value of the variable resistive element 3 to be gradually increased to a predetermined value at a predetermined velocity.

As the velocity of a resistance variation of the variable resistive element 3 increases, a surge voltage generated due to an inductance component of the motor 5 or an inductance component in a circuit (including the motor 5 and the inverter 1) also increases, which may lead to damage of the variable resistive element 3 or the motor 5. Accordingly, the velocity of the resistance variation of the variable resistive element 3 is set to be less than a predetermined value so that the surge voltage has a voltage value for which the variable resistive element 3 and the motor 5 are not damaged. That is, the velocity of the resistance variation of the variable resistive element 3 is set to a value such that the surge voltage generated according to the resistance variation is lower than a minimum surge-voltage value for which the variable resistive element 3 or the motor 5 is broken.

A final resistance value of the variable resistive element 3 depends on a motor drive control method. Even when a short-circuit failure occurs in the inverter 1, the inverter 2 is normally operated and thus a wheel steerer can perform a usual wheel operation, and when a final resistance value Ra of the variable resistive element 3 is about a value for which a current is conducted to the inverter 1 having a short-circuit failure, a torque (Tex) defined by the following equation can be generated.

$$Tex = \frac{P_m \cdot \phi^2}{L_a^2} \cdot \frac{R_a \cdot \omega}{\omega^2 + \left(\frac{R_a}{L_a}\right)^2} \quad (1)$$

Therefore, by this torque (Tex), occurrence of an abnormality can be notified to a wheel steerer. Pm denotes the number of pole pairs of the motor 5, φ denotes a motor field flux, ω denotes a motor angular velocity, and La denotes a motor inductance. That is, by reducing the final resistance value Ra of the variable resistive element 3 to about a value for which a current is conducted to the inverter 1 having a short-circuit fault, a regeneration current flows in the inverter 1 and this regeneration current causes change in magnetic flux in the motor 5, thereby generating the torque (Tex) mentioned above in a wheel by Faraday's law.

According to such a control method, when a failure occurs in any one of the inverters 1 and 2, a resistance of a variable resistive element arranged between the inverter having a fault and the motor 5 is gradually increased at a predetermined velocity, so that the surge voltage can be suppressed, and an excessive surge voltage to the variable resistive element and the motor 5 can be suppressed.

Next, there is assumed a case where a fault occurs in the inverter 1 when the motor 5 is driven by only the inverter 1 and the inverter 2 is in a standby state for a backup, for example. In this case, the controller 9 detects abnormalities of the output current and the output voltage of the inverter 1 based on a detection signal from the current/voltage detection device 6, and when the controller 9 detects a fault of the inverter 1, the controller 9 stops the inverter 1 and at the same time gradually increases the resistance value of the variable resistive element 3 to a predetermined value at a predetermined velocity. In this example, the velocity of the resistance variation and the final resistance value of the variable resistive element 3 are the same as those in the case of driving the inverters 1 and 2 simultaneously. Since the controller 9 operates the inverter 2, a wheel steerer can perform a usual wheel operation.

According to such a control method, when a fault occurs in any one operating inverter among a plurality of inverters, the resistance of a variable resistive element provided between the inverter having a fault occurred therein and the motor 5 is gradually increased at a predetermined velocity, so that the surge voltage can be suppressed and an excessive surge voltage to the variable resistive element and the motor 5 can be suppressed.

While a case where the two inverters 1 and 2 are connected to the motor 5 has been explained in the first embodiment, the same explanations can be also applied to a configuration in which three or more inverters are connected to the motor 5.

As explained above, according to the first embodiment, in a configuration in which a plurality of inverters are connected to the motor 5, variable resistive elements are provided between the inverters and the motor 5, respectively and when a fault occurs in any one of the inverters that drives the motor 5, a resistance value of a variable resistive element between the inverter having a fault occurred therein and the motor 5 is gradually increased at a predetermined velocity, so that the surge voltage can be suppressed, the motor 5 and the variable resistive element can be protected from damage caused by the surge voltage, and driving of the motor 5 can be continued by using a normal inverter other than the inverter having a fault occurred therein.

Second Embodiment

Figure 2:
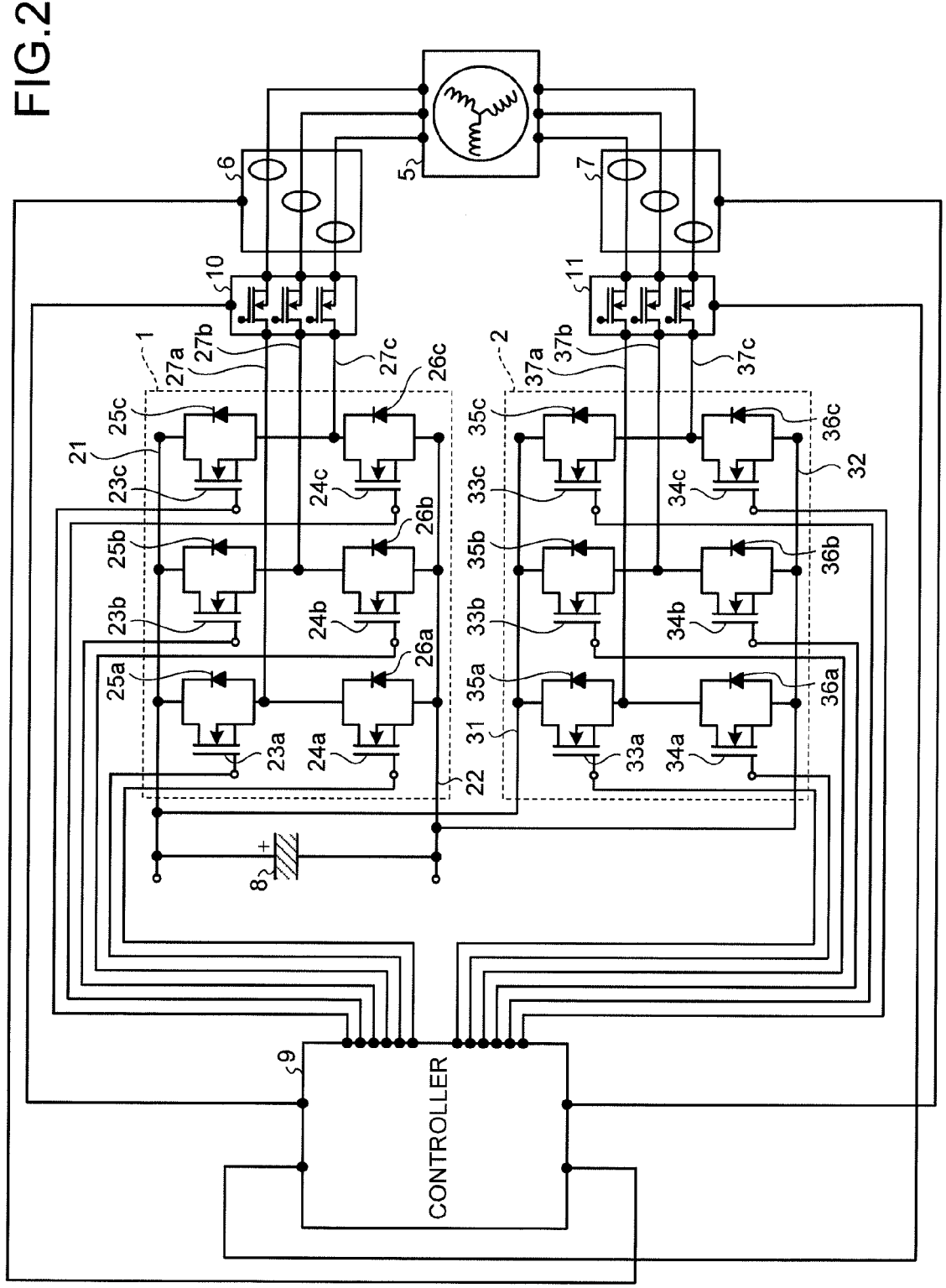
FIG. 2 is an electrical circuit diagram of a configuration of a drive control device according to a second embodiment of the present invention.

FIG. 2 is an electrical circuit diagram of a configuration of a drive control device according to a second embodiment of the present invention. In FIG. 2, the second embodiment is identical to the first embodiment except for configurations of variable resistive elements 10 and 11. Therefore, in FIG. 2, constituent elements identical to those shown in FIG. 1 are denoted by same reference signs.

The variable resistive element 10 is provided for each of the AC output lines 27a to 27c of respective phases between the inverter 1 and the motor 5, and the variable resistive element 11 is provided for each of the AC output lines 37a to 37c of respective phases between the inverter 2 and the motor 5. The variable resistive elements 10 and 11 are configured by a voltage-driven semiconductor element, for example. FIG. 2 shows the case where the variable resistive elements 10 and 11 are each configured by, for example, a MOSFET.

Figure 3:
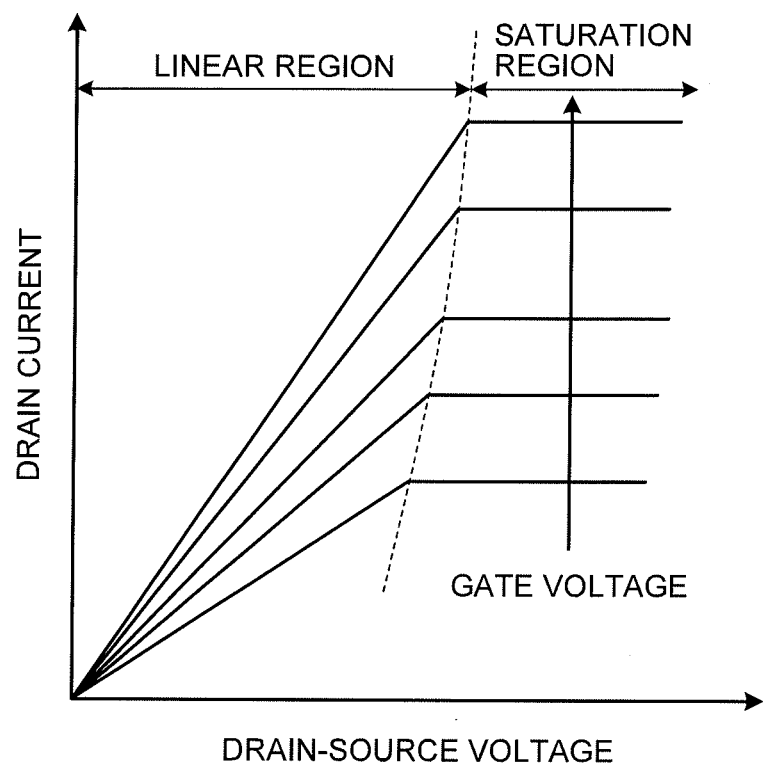
FIG. 3 is a graph showing an output characteristic of a MOSFET.

FIG. 3 is a schematic diagram of an output characteristic as one of the characteristics of a MOSFET. As shown in FIG. 3, it is understood that, in a linear region, a drain current increases linearly with respect to a drain-source voltage and the MOSFET exhibits a characteristic of a resistor. Furthermore, it is understood that, as a gate voltage increases, a gradient of a line of the drain current acting linearly with respect to the drain-source voltage increases and a resistance value is reduced. In this way, when the MOSFET is used in the linear region, the MOSFET can be regarded as a variable resistor by controlling its gate voltage. Further, a gate voltage value can be easily controlled by using a three-terminal regulator.

As explained above, because the MOSFET can be used for the variable resistive elements 10 and 11 and its resistance value can be easily changed externally, the controller 9 can easily set the resistance value of the variable resistive element 10 or 11 to an appropriate value at a predetermined velocity.

Further, by using the MOSFET for the variable resistive elements 10 and 11, as in the first embodiment, when the current/voltage detection device 6 or 7 detects an abnormality, the controller 9 stops an operation of an inverter having the abnormality detected therein, and gradually increases the resistance of a variable resistive element provided between the inverter having a fault occurred therein and the motor 5 at a predetermined velocity, thereby suppressing the surge voltage.

While a case of using, for example, a MOSFET as a voltage-driven semiconductor element has been described in the second embodiment, the same effects can be obtained even when other types of voltage-driven semiconductor elements including an IGBT, for example, are used.

According to the second embodiment, because the variable resistive elements 10 and 11 are voltage-driven semiconductor elements, a resistance value can be easily controlled. Other configurations, operations and effects of the second embodiment are identical to those of the first embodiment.

According to the present invention, there are advantageous effects in that it is possible to suppress generation of a surge voltage when a failure occurs in an inverter that drives a motor and driving of the motor is continued by other normal inverters.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive control device comprising:
   a plurality of inverters that are each connected to a motor and are configured to drive the motor;
   a variable resistive element that is connected between the motor and each of the plurality of inverters, and has its resistance value is configured to permit being externally and variably controlled;
   an output detection unit that is connected between the motor and each of the plurality of inverters, and is configured to detect at least one of an output current and an output voltage of each of the plurality of inverters; and
   a controller that, when a fault corresponding to a faulty inverter that drives the motor is detected based on a detection signal from the output detection unit, is configured to stop an operation of the faulty inverter, to gradually increase a resistance value of the variable resistive element provided between the faulty inverter and the motor at a velocity of a resistance variation such that a surge voltage generated due to an inductance component of a circuit including the motor and the faulty inverter has a voltage value for which the variable resistive element and the motor are not damaged, and to execute drive control of the motor using a different inverter of the plurality of inverters other than the faulty inverter.

2. The drive control device according claim 1, wherein the variable resistive element is a voltage-driven semiconductor element.

3. A drive control method of a controller that executes drive control of a motor connected with a plurality of inverters, wherein when a fault associated with a faulty inverter that drives the motor is detected by the controller by an output detection unit that is connected between the motor using each of the plurality of inverters and detects at least one of an output current and an output voltage of each of the plurality of inverters, the controller is configured to stop an operation of the faulty inverter, to gradually increase a resistance value of a variable resistive element provided between the faulty inverter and the motor at a velocity of a resistance variation such that a surge voltage generated due to an inductance component of a circuit including the motor and the faulty inverter has a voltage value for which the variable resistive element and the motor are not damaged, and to execute drive control of the motor using a different inverter of the plurality of inverters other than the faulty inverter.

* * * * *